United States Patent [19]

Eriksson et al.

[11] 3,870,486
[45] Mar. 11, 1975

[54] FLOOR SURFACE TREATING APPARATUS

[75] Inventors: Bolik Anders Gottfrid Eriksson, Johanneshov; Erik Karl Gustav Johansson, Sollentuna; Milos Vukotic, Tumba, all of Sweden

[73] Assignee: Aktiebolaget Electrolux, Stockholm, Sweden

[22] Filed: Sept. 19, 1973

[21] Appl. No.: 398,846

[30] Foreign Application Priority Data
Sept. 22, 1972 Sweden.............................. 12242/72

[52] U.S. Cl........................ 55/276, 55/309, 55/215, 55/337, 55/467, 55/DIG. 3, 55/DIG. 8
[51] Int. Cl............................................. B01d 45/16
[58] Field of Search ............ 55/217, 219, 270, 274, 55/276, 337, 315, 318, 319, 320, 332, 356, 357, 383, 410, 413, 459, 471, 472, 527, DIG. 3, DIG. 8, DIG. 34, 215, 327, 307, 467; 116/109, 114 AD, 118; 15/326, 353

[56] References Cited
UNITED STATES PATENTS
2,534,808  12/1950  Bevington, Jr. et al............... 15/353
2,719,596  10/1955  Kent et al............................. 55/276
3,046,718   7/1962  Ide et al............................... 55/276
3,082,465   3/1963  Wood ................................ 55/DIG. 3
3,180,071   4/1965  Nolte ................................ 55/DIG. 3
3,320,727   5/1967  Farley et al........................... 55/356

Primary Examiner—Frank W. Lutter
Assistant Examiner—David L. Lacey

[57] ABSTRACT

A floor surface treating apparatus having multistage dust and liquid separation and in which the apparatus is provided with an upper part having an inlet for dust-laden air or liquid, and a discharge opening for clean air. A cyclone separator and a motor fan unit are mounted substantially centrally in the apparatus. The separated dust as well as the separated liquid is collected in the lower part of the apparatus from the cyclone separator, and the air outlet in the cyclone separator communicates with the clean air outlet through a filter and the motor fan unit of the apparatus.

7 Claims, 5 Drawing Figures

FLOOR SURFACE TREATING APPARATUS

BACKGROUND OF THE INVENTION

In known floor treating apparatus, the dust picked up by the machine is separated to a large extent at the exterior surface of a generally spherical filter clamped in a supporting frame. The separated dust or dirt is collected in the bottom of the container. This arrangement constitutes a one stage separation and as a result the filter rapidly becomes dirty and clogged and must be cleaned frequently. Moreover, in the known floor treating apparatus, the filter is so located in the machine that the effective dust collecting space therein is limited. Therefore, the container for dust must be emptied frequently which is both troublesome and time consuming.

The present invention relates to a floor surface treating apparatus in which a multi-stage separation of the dirt is employed thereby lengthening the time intervals between cleaning of the filter and at the same time providing a dirt collecting chamber that is larger than the spaces provided for this purpose in presently known floor treating apparatus. a compact floor treating apparatus in which the cleaning of the filter is required less frequently and the dirt collecting chamber has a larger effective dust collecting space. In order to provide for more dust collecting space in the present apparatus, the cyclone separator and motor fan unit are arranged in the apparatus on the same side of the filter.

A further object of the present invention is to provide a filter comprising superposed layers of inorganic material, such as fiberglass, forming an integrated structure.

Another object of the present invention is to provide a channel for a separate air flow to cool the motor.

An object of the present invention is to provide an electronic level sensor within the container or housing of the apparatus which disconnects the power supply to the motor when the liquid in the container rises to a predetermined level.

The invention will now be more fully described with reference to the accompanying drawings in which.

DESCRIPTION OF THE PREFERRED EMBODIMENT

Figure 1:
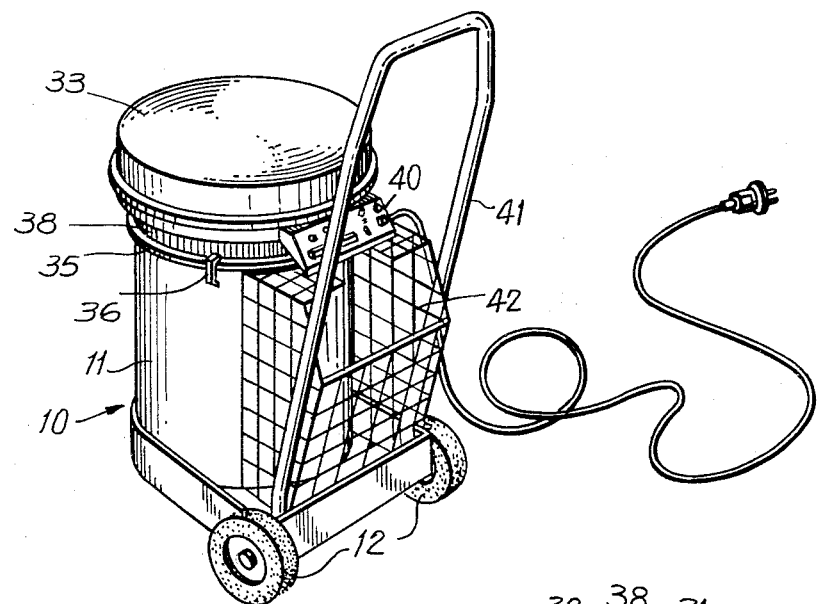
FIG. 1 is a perspective view of the floor surface treating apparatus constructed in accordance with the teachings of our present invention.
Figure 4:
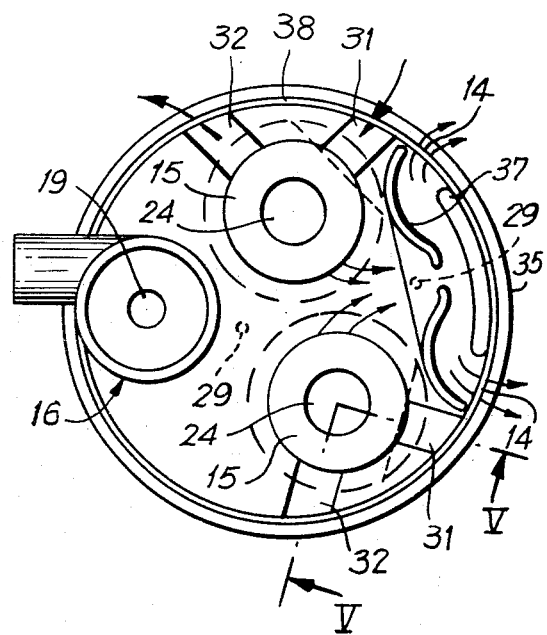
FIG. 4 is an enlarged top plan view of the container shown in the bottom of FIG. 2.
Figure 2:
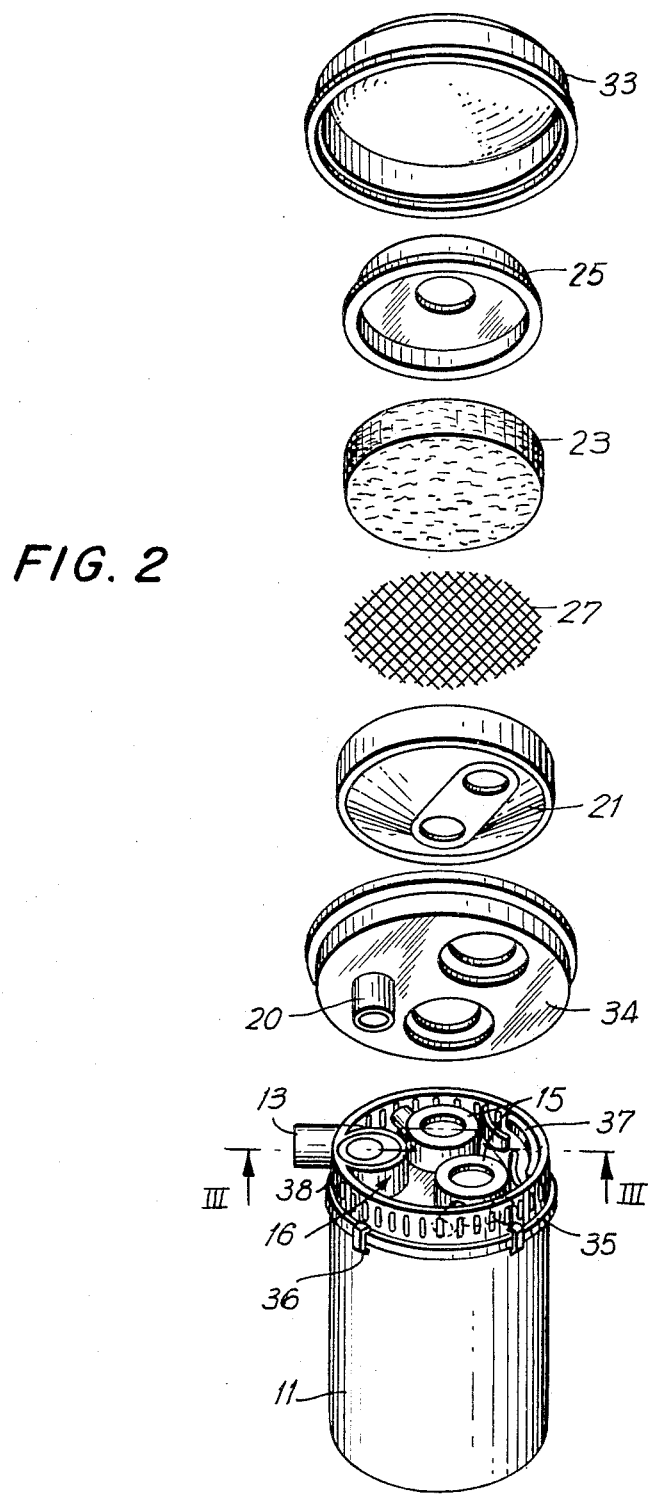
FIG. 2 is an exploded view of the primary parts of the apparatus shown in FIG. 1.
Figure 3:
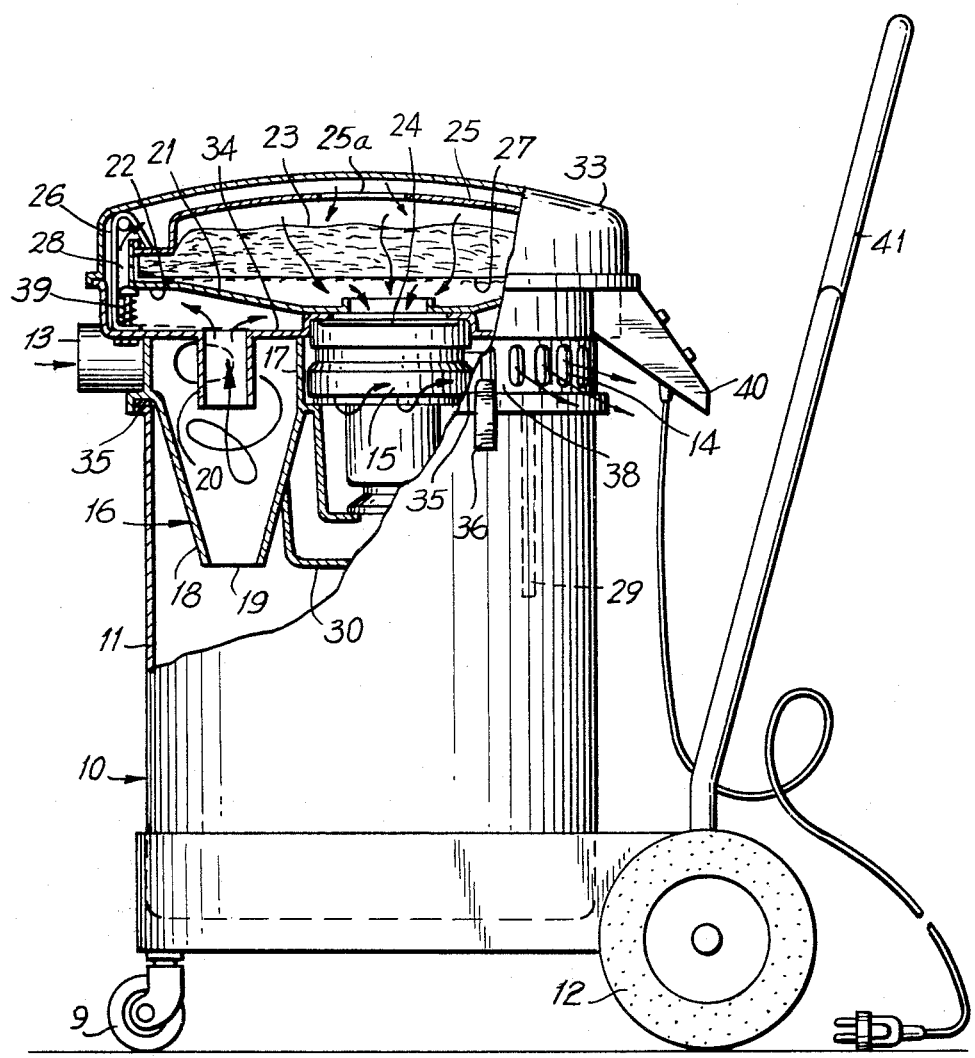
FIG. 3 is an enlarged side elevational view, partly in section taken along the lines III—III of FIG. 2, of the apparatus.

The floor surface treating apparatus, as shown in FIGS. 1 and 3, is referred to generally by the numeral 10 and includes a housing 11 supported on wheels 9 and 12. The apparatus can be pushed by means of a handle 41 over the work surface to be treated. As seen in FIGS. 2, 3, and 4, the upper portion of the housing 11 is provided with an inlet opening 13 for either dust-laden air or liquid. Working members (not shown) for treating or maintaining the floor can be coupled to the inlet opening 13 by means of a hose (not shown). Circumferentially located in the top portion of the housing 11 are discharge openings 14 for the ejection of clean air from the apparatus. It will be noted that a motor fan unit 15 is arranged to transport air from the inlet opening 13 to the discharge opening 14 through the cyclone separator 16. The latter is connected to the inlet opening 13 and functions as the first dust separating stage of the apparatus.

The cyclone separator 16 is more clearly illustrated in FIG. 3, having a cylindrical part 17 and a downwardly extending frusto-conical portion 18. The bottom opening 19 forms the dust or liquid outlet of the separator 16. As seen in FIG. 4, the inlet opening 13 is tangential to the cylindrical part 17 of the separator so that the dust-laden air or liquid entering the separator 16 is caused by the cyclone effect to rotate strongly within the separator 16. Arranged co-axially in the cylindrical part 17 of the separator 16 is a tubular memberr 20 forming the air outlet of the separator. The remainder of the cylindrical part 17 is closed; thus, the only air outlet is the aforesaid tubular member 20.

A shallow, funnel-shaped, intermediate wall 21, as seen in FIG. 3, is located in a generally horizontal plane above the air outlet 20. The wall 21 is provided with a supporting surface 22 for a filter 23. In the bottom of funnel-shaped wall 21 is an inlet opening 24 for the motor fan unit 15. The filter is retained on the supporting surface 22 by an attachment means 26 (FIG. 3), and a grate 27 which is secured to the bottom of the filter and a hood 25 that is located above the filter 23. The hood is provided with a central opening 25a. An annular passage 28 is formed between the periphery of the filter 23 and the adjacent interior surface of housing 11. Air discharged from the air outlet 20 of the separator 16 flows through the annular passage 28 to the top side of the filter 23 after which the air flows through the filter to the inlet opening 24 in the intermediate wall 21 and then to the motor fan unit 15.

Figure 5:
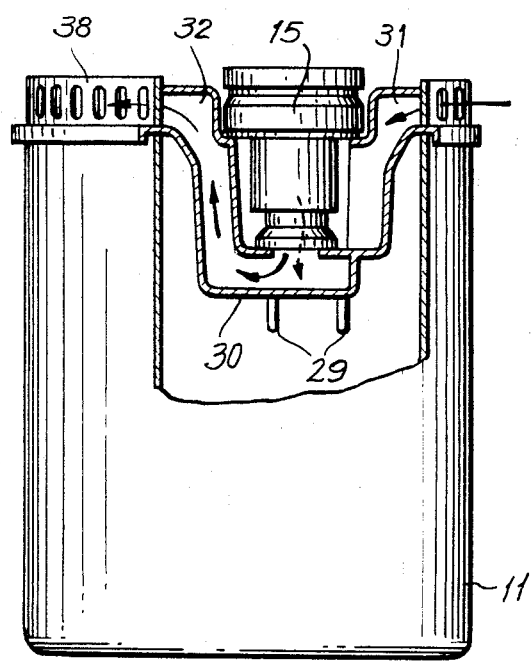
FIG. 5 is a vertical section view taken along the lines V—V of FIG. 4.

It will be noted, especially from viewing FIGS. 3 and 5, that the motor fan unit 15 is positioned in the housing 11 on approximately the same level or plane as the cyclone separator 16. This arrangement results in the reduction of the overall height of the apparatus over other known floor treating devices, since the motor fan unit is not located above the filter but below and along side of the separator. In the present arrangement, the space around the separator is utilized to form an air flow channel 28 as explained hereinabove. Both the motor fan unit 15 and separator 16 are located below the filter 23, the latter being arranged generally horizontally between the air flow path from the air outlet 20 of the cyclone separator 16 to the inlet opening 24 to the motor fan unit 15.

The filter 23 is rather flat and comprises several superposed layers of inorganic material, for example fiberglass. The filter layers are integrated, thus forming a single structure, the thickness of which is approximately 5 cm.

Referring now to FIGS. 3 and 5, it will be observed that electronic level sensors 29 are shown projecting downwardly in the housing 11. This apparatus can also be used to suck up liquid from floor surfaces being wet treated. The electronic level sensors 29, which are well known and therefore need not be described in detail, ensure the disconnection of the electric circuit or power supply to the motor fan unit 15 when the liquid present in the housing 11 rises to a predetermined level thereby preventing the additional elevation of the liquid level to the outlet 19 of the separator 16.

As seen in FIGS. 4 and 5, the motor is cooled by a separate air flow. In this regard, a casing 30 supports the motor fan unit 15 which forms an air flow channel. Atmospheric air is drawn into the apparatus through an inlet channel 31 and is discharged through an outlet channel 32, and then to the atmosphere after having cooled the essential parts of the motor.

A removable cover 33 for the housing 11 permits easy access to the separator 16 and motor fan unit 15. A generally horizontal partition 34 particularly seen in FIG. 2 supports both the cyclone separator and the motor fan unit and separates the filtering space from the dust collecting space in the housing 11. The partition 34 is arranged to be lifted out of the housing 11 in order to remove the collected dust or liquid therein. The upper and lower parts of housing 11 have a gasket 35 therebetween and are held together by clamps 36.

As seen in FIGS. 2 and 4, a sound absorber 37 is located in the housing 11 in a manner to form an air passage between two generally curved vanes and an opposite wall between the exhaust opening of the motor fan unit 15 and the exhaust louvre 38. Referring to FIG. 3, a spring-loaded pin 39 acts on the switch (not shown) of the motor fan unit 15 to prevent the motor from being started when no filter has been inserted in the housing 11.

An instrument panel 40 for the apparatus is shown in FIGS. 1 and 3. In addition, the handle 41 facilitates the movement of the apparatus. A basket 42 is located between the handle 41 and adjacent outer surface of the housing 11. In the basket 42 detergents, polishes, and other materials may be stored.

The operation of the present floor surface treating apparatus is as follows: Dust-laden air or liquid is drawn by suction by means of the motor fan unit through the tangentially arranged inlet opening 13 and is rotated strongly within the cyclone separator 16. Due to the cyclone effect, large dust particles are separated and fall through the frusto-conical part 18 of the separator to the bottom of housing 11. Laboratory tests have shown that about 98–99 per cent of the dust normally present on the floor being treated is separated in the cyclone separator 16. The remaining quantity of dust is carried with the air flow through the air outlet 20 of the separator and along the underside of the funnel-shaped intermediate wall 21 and through the passage 28 between the periphery of the filter and the adjacent inner wall of the housing 11. The air flow follows the path of the arrows illustrated in FIG. 3 to the filter 23. There is additional separation of the remaining dust in the filter 23 as the air flow continues along the upper side of the intermediate wall 21 to the inlet opening 24 of the motor fan unit 15, and then passes through the vanes thereof and further through the sound absorber 37 to be discharged to the atmosphere through the discharge opening 14 of the louvre 38.

The use of a cyclone separator in the first stage of a two-stage filter operation results in the partially cleaned air being conveyed to a filter in the second stage after large and sharp objects have been removed from the air flow, thus avoiding damage to the filter. It is additionally desired to point out that it is possible, within the teachings of the present invention, to substitute a secondary cyclone separator for the filter 23 and achieve the desired results from the apparatus.

We claim:

1. A floor surface treating apparatus comprising a container having an upper part provided with an inlet opening for dust-laden air or liquid and discharge opening for clean air and a lower part for collecting separated dust or separated liquid, a generally vertically disposed cyclone separator in said container operatively connected to said inlet opening, at least one motor-fan unit in said container for moving air through said container, a relatively flat filter extending substantially across the entire width of the upper part of said container, means supporting said filter above both said separator and said motor-fan unit; said support means comprise means forming a housing around said filter; and said housing having an air inlet above said filter and air outlet below said filter, and said support means further forms a passageway from said separator to the inlet of said housing whereby air leaving said separator follows said passageway to the inlet of said housing and then flows through said filter and said housings outlet to the inlet of said motor-fan unit and subsequently to said discharge opening for clean air, and said separator being provided with a dust and liquid outlet communicating with said lower part of said container.

2. The apparatus as claimed in claim 1 wherein said supporting means comprising a substantially funnel-shaped intermediate wall, the upper peripheral edge of which supports said filter, and the lower part of said intermediate wall being provided with said opening that communicates with the inlet opening of said motor-fan unit.

3. The apparatus as claimed in claim 1 further comprising a sound absorber structure arranged in the upper part of said housing container between the exhaust opening of said motor fan unit and said discharge opening.

4. The apparatus as claimed in claim 1 further comprising a liquid level sensor in the lower part of said housing container.

5. The apparatus as claimed in claim 1 wherein said filter comprises a plurality of superposed layers of inorganic material forming an integrated structure.

6. The apparatus as claimed in claim 5 wherein said filter material is fiberglass.

7. The apparatus as claimed in claim 5 wherein the thickness of said filter is approximately 5 cm.

* * * * *